United States Patent [19]
Gut et al.

[11] Patent Number: 5,108,496
[45] Date of Patent: Apr. 28, 1992

[54] METHOD FOR THE CONCENTRATION OF DUSTS IN A CUPOLA FURNACE WITH METAL PARTICLES

[75] Inventors: Karl Gut, Benken; Rolf Rietzscher, Mettmann; Hans-Ludwig Roes, Schaffhausen; Ivo Henych, Stetten, all of Switzerland

[73] Assignee: Georg Fischer AG, Schaffhausen, Switzerland

[21] Appl. No.: 478,650

[22] Filed: Feb. 9, 1990

[30] Foreign Application Priority Data

Feb. 9, 1989 [CH] Switzerland ............... 00492/89

[51] Int. Cl.$^5$ ............................................ C22B 7/02
[52] U.S. Cl. ............................................ 75/407; 75/660; 75/961; 423/107; 423/108
[58] Field of Search .................. 75/961, 407, 660; 266/157, 900; 423/107, 108

[56] References Cited

U.S. PATENT DOCUMENTS

4,283,223 8/1981 Billard .................... 75/961
4,878,943 11/1989 Kepplinger .............. 266/157

FOREIGN PATENT DOCUMENTS

3131898 4/1982 Fed. Rep. of Germany .

Primary Examiner—Melvyn J. Andrews
Attorney, Agent, or Firm—Bachman & LaPointe

[57] ABSTRACT

A process for the econimic recovery of metallic fractions generated during operation of a cupola furnace comprises the steps of the separating filter dust containing metal fractions from an off-gas stream and recirculating the metal fraction back to the cupola furnace for combustion with additional feedstock so as to enrich the metallic concentration of the filter dust to a level where economic recovery of the metallic fraction can occur.

3 Claims, 1 Drawing Sheet

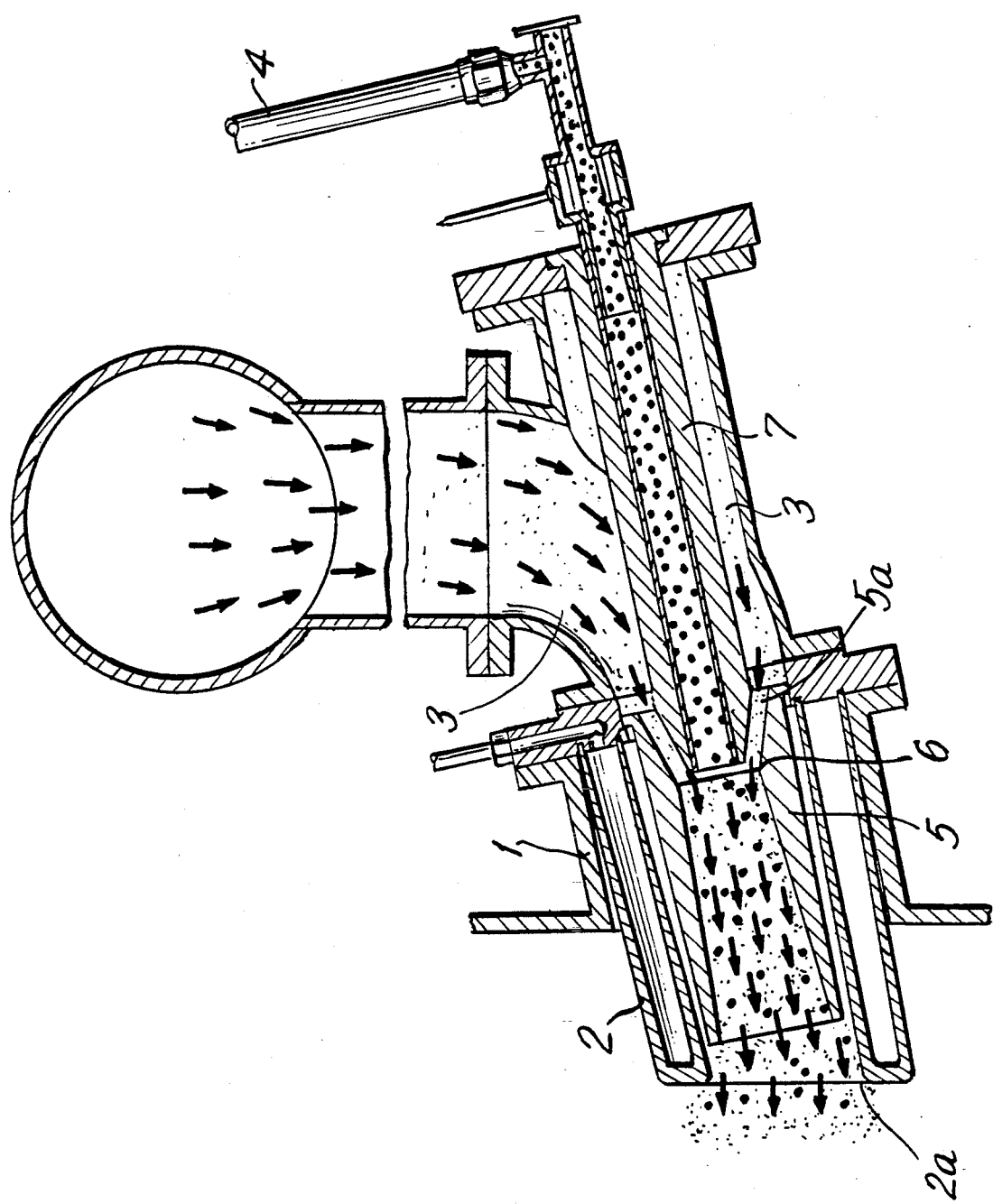

METHOD FOR THE CONCENTRATION OF DUSTS IN A CUPOLA FURNACE WITH METAL PARTICLES

BACKGROUND OF THE INVENTION

1. Field of the Invention

The present invention relates to a method for the concentration or enrichment of dusts obtained in a cupola furnace with metals and their oxides, wherein the dusts formed in the cupola furnace are intercepted by means of a filter arrangement.

2. Description of the Invention

Shaft furnaces, in particular cupola furnaces, for smelting cast iron have been known for a long time. The metallic charge is smelted with the addition of energy carriers, crude iron, returned material and scrap being employed in varying quantitative proportions.

Various metals contained in the scrap fraction, such as, for example, zinc, cadmium, lead, etc. vaporize during this smelting process. To prevent air pollution, stringent requirements must be met by the collection of dust from cupola furnace waste gases, so that the resulting gaseous metal particles are no longer allowed to be discharged into the open but must be intercepted in a filter arrangement provided downstream of the cupola furnace. In the past, metallic dusts collected in the filter have been treated in various ways such that they were rendered suitable for dumping and disposal was possible.

It is the object of the present invention economically to recover metallic fractions which collect in a filter arrangement of a cupola furnace, in order to avoid dumping which pollutes the environment and causes costs.

SUMMARY OF THE INVENTION

According to the invention, this object is met by collecting the vaporizable metals in a filter in a cupola furnace in the form of oxides and introducing the metals repeatedly into the combustion process of the cupola furnace until a preset utilizable concentration of the metal fraction in the filter dust is reached.

The metallic dusts collecting in a filter arrangement of a cupola furnace sometimes contain particles which pollute the environment. Controlled disposal is therefore necessary. The formation of these oxides which pollute the environment is due to the fact that, because of the relatively large fraction of scrap, stacks of sheet metal from the automobile sector and shredder scrap which contain, as is known, a relatively high proportion of zinc and other materials are introduced into the combustion process.

When filter dust containing zinc oxides is introduced into the combustion process of a cupola furnace, the zinc oxide is first reduced in the combustion zone at temperatures between 1500° and 1600° C. and rises in the gaseous form to the top of the cupola furnace and is oxidized there, so that zinc oxide is formed again. If this step is repeated several times, the dusts can be enriched with zinc in the filter to such an extent that recovery of the zinc from the filter dust is feasible. As a rule, this is the case for a zinc content in a range between 10 and 95 percent by weight.

The method has a dual advantage, namely, an advantage to the operator of the cupola furnace plant and an advantage to the environment. This is because the concentration of the dusts makes dumping unnecessary, and the concentrated metal is economically re-utilizable.

In accordance with a further feature of the invention, the metal-containing dusts are introduced into the cupola furnace by means of a device such as, for example, a nozzle arrangement, lances, etc.

In accordance with another feature, the metal particle concentration is set at a re-utilizable percentage of at least 10 to 95 percent by weight.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

In the drawing:

The single figure of the drawing is a cross sectional view of a device for feeding materials into a cupola furnace.

DETAILED DESCRIPTION OF THE INVENTION

The figure of the drawing shows a device for reintroducing in a cupola furnace the metal-containing dusts which are collected in a filter arrangement, not shown, mounted downstream of the cupola furnace.

Specifically, the drawing shows a furnace wall 1 and an insert 2, preferably of a metal material, with a passage channel 2a mounted in the furnace wall 1. A feeding circuit 3 for feeding hot air into the combustion zone ends in a recess of insert 2. An injector nozzle 7 is installed in the feeding channel 3. The injector nozzle 7 is supplied with material via a feeding pipe 4. An insert 5 is provided in the passage channel 2a. The internal diameter of the insert 5 widens from location 6 to the opening 5a.

In operation, the quantity of coke substitute introduced into the cupola furnace is variable and depends on analyses which have been carried out on the manner in which the cupola furnace is operated, the quality of the iron and the quality of the coke. The preferred quantity of coke substitute is up to 50% of the carbon available in the shaft. In other words, up to 50% of the carbon or coke can be replaced by other materials.

If dusts are introduced into the cupola furnace instead of coke in order to remove dust-like waste materials, up to 35% of the quantity used can be replaced by such waste materials.

The waste materials are preferably dusts from the operated cupola furnace and slags which pollute the environment, particularly carbide slags.

While the invention has been illustrated and described as embodied in a method for concentration of dusts in a cupola furnace, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A process for the economic recovery of metallic fractions generated during operation of a cupola furnace comprising:
   a) feeding a metallic furnace feedstock to a cupola furnace;
   b) combusting said metallic furnace feedstock in said furnace so as to produce an off-gas stream;
   c) passing said off-gas stream to a filter means downstream of said furnace;
   d) filtering said off-gas stream in said filter means so as to separate filter dust having a metal fraction concentration from said off-gases;
   e) recycling said separated filter dust having said metal fraction concentration to said furnace for combustion with said metallic furnace feedstock so as to produce a gas stream having a dust enriched in metal fraction concentration;
   f) separating said filter dust having an enriched metal concentration from said gas stream;
   g) repeating steps (e) and (f) so as to further enrich the metal concentration in said filter; and
   h) thereafter recovering said metal from said filter dust.

2. A process according to claim 1 wherein step (g) is repeated until the metal concentration of the enriched filtered dust is at least 10% by weight.

3. A process according to claim 2 wherein the metal concentration is in the form of zinc oxide.

* * * * *